Patented Jan. 10, 1950

2,493,818

UNITED STATES PATENT OFFICE

2,493,818

PROCESS OF MAKING AN AVOCADO FOOD PRODUCT

Laurence E. Harrison, Fallbrook, Calif., assignor of one-half to Maude J. Anderson, Hollister, Calif.

No Drawing. Application April 19, 1948, Serial No. 21,865

4 Claims. (Cl. 99—154)

This invention relates to a process of making a preserved avocado food product.

This application is a continuation-in-part of my application Ser. No. 702,852, filed October 11, 1946, now abandoned.

The term "avocado meat" will be used herein to designate the edible portion or pulp of the avocado fruit, with the skin and seeds removed.

The principal object of this invention is to produce an avocado food product of cheese-like consistency, retaining the major portion of the initial food value of ripe avocado meat in a state of preservation that imparts excellent keeping qualities thereto, whereby the product may be kept for long periods without deleterious change in color, consistency, food-value or flavor.

A further object is to produce an avocado food product of cheese-like consistency and good keeping qualities, retaining substantially the natural color and pleasing appearance of fresh avocado meat, and having highly palatable flavor characteristics.

A particular object of the invention is to provide for the treatment of the avocado meat in such manner as to prevent darkening or discoloration of the resulting food product.

Another important object of the invention is to provide an avocado food product having a considerably higher oil content that the initial avocado meat, and, particularly, to so increase the oil content as to preserve the food product and greatly increase its keeping qualities without requiring the presence of any other preservative agent. Furthermore, since a large proportion of the food value of avocado meat is contained in the oil, the increase in oil content enhances the food value of the product.

A further object is to provide a process for the production of a food product having the above mentioned desirable characteristics and of substantially uniform quality and consistency, in spite of considerable variations in oil content or other characteristics of the initial avocado meat.

The production of a satisfactory preserved food product from avocados presents problems quite different from those encountered in the preservation of other fruits or vegetables.

Preservation by any method involving cooking or heating at elevated temperature is entirely unsatisfactory because of the resulting highly unpalatable flavor and also because cooking tends to cause the avocado meat to disintegrate or become soft and mushy, so that the product is not only of poor flavor but also has an undesirable appearance or consistency.

Ordinary pickling methods such as are commonly employed with other fruits or vegetables, in which the resulting product is preserved and retained in a liquid or semi-liquid vehicle, are also unsatisfactory because in such processes also the fragile quality of the avocado meat causes it to disintegrate or become soft and mushy, so that the product is quite unsatisfactory in appearance and consistency.

One of the most serious obstacles to the production of a preserved avocado food product is the discoloration of the avocado meat, which darkens rapidly and soon becomes quite black on exposure to air. This discoloration is believed to be due to the action of an enzyme present in the avocado meat, which promotes oxidation and resulting darkening of the natural coloring matter or other constituents of the meat. It is, therefore, an important object of the invention to prevent this discoloration by destroying this discoloration-promoting enzyme, and thus retain substantially the natural color of the avocado meat.

I have discovered that the discoloration of avocado meat can be completely prevented and eliminated by subjecting it to a properly conducted lactic acid vacilli fermentation, presumably due to destruction of the enzyme that normally promotes such discoloration. I have found, further, that this lactic acid bacilli fermentation can best be carried out at about normal atmospheric temperature, such as from about 70° to about 80° F., in the presence of a salt solution or brine of such strength as to inhibit the development of harmful bacteria, while permitting the lactic acid bacilli to multiply rapidly and thus cause the lactic acid fermentation to progress at a satisfactory rate. The temperature during fermentation is not especially critical; it may be conducted at temperatures somewhat above or somewhat below the above-mentioned range, but the best results are generally obtained when the temperature is kept within this range.

The lactic acid fermentation is generally conducted in the presence of a sodium chloride brine having a specific gravity between about 10° and 20° Bé., and preferably about 12° to 15° Bé. In a brine of this concentration, the fermentation progresses rapidly, generally causing the acidity to increase to a pH below 6 within about 48 hours, and fermentation is generally substantially complete within about one or two weeks. In most cases, a fermentation period of about ten to twelve days gives the best results.

The lactic acid is believed to be formed from one or more sugars or other carbohydrates in the avocado meat. The fermentation causes a reduction in the sugar content of the avocado meat, and is preferably continued until the sugar content is reduced to a low value or substantially eliminated. This reduction or substantial elimination of sugar is believed to be an important factor in the good keeping quality of the product.

Following fermentation, the avocado meats are subjected to contact with sterile water, preferably at about normal temperature, to leach out excess salt and reduce the salt content to a palatable level, such as about 1 to 2%. The fermentation and leaching steps may advantageously be conducted by placing the avocado meats in closely woven cotton bags that are pervious to water, immersing them in brine inoculated with lactic acid bacilli until fermentation is complete, then removing the bags and their contents from the brine and immersing them in fresh water to leach out excess salt as noted above.

At this stage, the treated avocado meats are in a somewhat disintegrated condition and are partly reduced to a soft, pulpy mass. The treated product contains a considerable amount of water and, in this condition, is perishable and subject to deterioration if kept in this condition because the lowering of the salt content to the palatable level has removed the preservative effect of the salt.

In fresh ripe avocados, the oil content is highly emulsified with water, and if untreated avocado meats are subjected to pressure to express liquid therefrom, the expressed liquid is an oil-water emulsion containing oil and water in approximately equal proportions. I have further discovered, however, that by subjecting the avocado meats to lactic acid bacilli fermentation followed by leaching with water, as described above, the oil and water are largely freed from their emulsified condition, so that by subjecting the treated material to a pressing operation while contained in a liquid-pervious container which retains the solid constituents therein, a considerable portion of the water content may be expressed with relatively little expression of oil. If the pressure is continued, the oil-water ratio of the expressed liquid increases, until the proportion of oil in the liquid being expressed equals, and finally exceeds, the proportion of water.

I prefer to continue the pressing operation only to about the point when the oil is being expressed in about equal proportion to the water, which I term the "oil-water level" point. At this stage, a large proportion of the water contained in the product following fermentation and leaching has been removed, while a high proportion of the oil content is retained.

The resulting product has a cheese-like consistency, resembling that of American cream cheese. The product is slightly acid, generally having a pH between 5 and 6, and this acidity remains substantially constant during subsequent aging and storage, particularly if kept at a moderately low temperature, such as about 40° F. The water content thereof is generally less than 60% and is preferably reduced to less than 50%, as compared to a usual water content of between 70% and 85% in the original avocado meats. On the other hand, the oil content is increased to about 30% or more, and preferably to above 35%, as compared with a usual oil content of between 10% and 20% in the original avocado meats. This product has a highly palatable flavor, an attractive color that does not darken on standing, and contains the major portion of the initial food value of the avocado meats. It is well preserved and may be kept for long periods without any deleterious change in flavor, color or consistency, due apparently to the preservative effect of the increased oil content. In fact, the product improves somewhat on aging at a moderately low temperature such as about 40° F., and I prefer to store it for aging at such temperature for a period of a few weeks or longer. It is also amenable to processing to form other food products, as by mixing with milk cheese or by adding other vegetable flavoring materials.

The following is a more specific description of a preferred example of the process.

Ripe avocados are peeled and cut and the seeds are removed therefrom, and the avocado meats are then preferably washed. Twenty-five pounds of the sliced avocado meats are placed in a closely woven cotton bag, and the bag and the contained avocado meats are submerged in ten gallons of brine, such as a 14° Bé. sodium chloride solution. The brine is inoculated with about one-half pint of lactic acid bacilli culture and a temperature of 70° F. is maintained. Fermentation proceeds rapidly, and the pH of the brine is generally reduced to about 5.4 within 48 to 72 hours. The pH of the brine is preferably determined daily to follow the course of the fermentation. The concentration and temperature of the brine are also observed regularly and adjusted, if necessary, to maintain them substantially constant. Fermentation is continued for about ten to twelve days, when it is substantially complete.

The bag containing the fermented avocado meat is then removed from the brine and immersed in fresh sterile water to leach salt from the fermented avocado meat, until the salt content thereof is reduced to about 1½%. This ordinarily requires from 8 to 12 hours or less, depending upon the size and physical condition of the pieces of fermented avocado meat. The bag is then removed from the water and allowed to drain for a short period.

The top of the bag is then folded over so that the avocado meat can not escape therefrom when pressure is applied, and the bag containing the avocado meat is then subjected to mechanical pressure in any suitable form of press, to express liquid therefrom. The pressure is preferably applied slowly, and gradually increased. The liquid first expressed consists principally of water and contains only a relatively small proportion of oil. The proportion of oil to water in the liquid being expressed increases as the water content of the product decreases, and the expressing of liquid is continued until the rate of expression of oil becomes about equal to the rate of expression of water.

The bag is then removed from the press, and the resulting material, which is the food product of the present invention, is removed from the bag. It is then preferably placed in a suitable container and placed in storage for aging at about 40° F.

When using well ripened avocadoes, and by careful control of the process, I am able to produce a finished product having an oil content of nearly 40%, and a water content of about 45% or less. However, the composition of the product is dependent upon variable factors, particularly the quality and maturity of the avocados. For example, a product prepared from average field run culls contained 38% oil, 16% solids, and 46% water, while a product prepared from very immature avocados contained only 29% oil, 17% solids, and 54% water. The latter product was inferior in every respect, as might be expected in view of the highly fibrous structure and low oil content of immature avocados. I prefer, therefore, to use well ripened avocados and to produce a finished product having an oil content as near 40% as practical considerations will allow, thus obtaining a product that is of the highest quality in every respect, including texture, color, flavor and keeping qualities.

I claim:

1. The process of making a preserved avocado food product which comprises: subjecting avocado meat to lactic acid bacilli fermentation to produce a slight acidity and form a product substantially free from enzymes tending to cause discoloration; and thereafter pressing said product to express therefrom liquid consisting principally of water and containing a minor proportion of oil, until the water content of the product is reduced to below 60%, to form a food product of cheese-like consistency containing solid constituents of the fermented avocado meat and having a higher oil content than the original avocado meat.

2. The process of making a preserved avocado food product which comprises: subjecting avocado meat to lactic acid bacilli fermentation in the presence of an aqueous solution of sodium chloride to produce a slight acidity; leaching the fermented avocado meat with water to reduce the sodium chloride content theerof to a palatable level; and thereafter pressing the product to express therefrom liquid consisting principally of water and containing a minor proportion of oil, until the water content of the product is reduced to below 60%, to form a food product of cheese-like consistency containing solid constituents of the fermented avocado meat and having a higher oil content than the original avocado meat.

3. The process of making a preserved avocado food product which comprises: subjecting avocado meat to lactic acid bacilli fermentation in the presence of an aqueous solution of sodium chloride to produce a slight acidity; leaching the fermented avocado meat with water to reduce the sodium chloride content thereof to a palatable level; and thereafter pressing the product to express therefrom liquid consisting principally of water and containing a minor proportion of oil, and continuing the expression of liquid until the rate of expression of oil becomes about equal to the rate of expression of water, to form a food product of cheese-like consistency containing solid constituents of the fermented avocado meat and having a higher oil content and a lower water content than the original avocado meat.

4. The process of making a preserved avocado food product which comprises: subjecting avocado meat to lactic acid bacilli fermentation in the presence of an aqueous brine having a specific gravity between 10° and 20° Bé.; continuing such fermentation until the pH is below 6 and the fermented avocado meat is substantially free from enzymes tending to cause discoloration thereof; then leaching the fermented avocado meat with water to reduce the salt content thereof to a palatable level; and thereafter pressing the product to expel liquid consisting principally of water and form a product of cheese-like consistency having a lower water content and a higher oil content than the original avocado meat.

LAURENCE E. HARRISON.

REFERENCES CITED

The following references are of record in the file of this patent:

UNITED STATES PATENTS

| Number | Name | Date |
|---|---|---|
| 1,001,253 | Crolbois | Aug. 22, 1911 |
| 1,249,511 | Saxe | Dec. 11, 1917 |
| 1,698,294 | Beckman | Jan. 8, 1929 |
| 2,322,880 | Pollak | June 29, 1943 |
| 2,325,327 | Lachle | July 27, 1943 |